US 6,749,912 B2
Jun. 15, 2004

(12) United States Patent
Delius et al.

(10) Patent No.: US 6,749,912 B2
(45) Date of Patent: Jun. 15, 2004

(54) POLYAMIDE-CONTAINING POLYMER COMPOSITIONS AND FILMS PRODUCED THEREWITH

(75) Inventors: Ulrich Delius, Frankfurt (DE); Hans-Gerhard Fritz, Uhingen (DE); Runsheng Lue, Stuttgart (DE)

(73) Assignee: Kalle GmbH & Co. KG, Weisbaden (DE)

( * ) Notice: Subject to any disclaimer, the term of this patent is extended or adjusted under 35 U.S.C. 154(b) by 0 days.

(21) Appl. No.: 10/602,676

(22) Filed: Jun. 25, 2003

(65) Prior Publication Data

US 2004/0087720 A1 May 6, 2004

Related U.S. Application Data

(62) Division of application No. 09/963,512, filed on Sep. 27, 2001, now Pat. No. 6,610,783.

(30) Foreign Application Priority Data

Sep. 27, 2000 (DE) .......................... 100 47 772

(51) Int. Cl.⁷ .................. B29D 7/01; B29D 22/00
(52) U.S. Cl. .......................... 428/35.7; 428/98
(58) Field of Search .................. 428/35.7, 98

(56) References Cited

U.S. PATENT DOCUMENTS

| 4,303,711 A | 12/1981 | Erk et al. |
|---|---|---|
| 4,944,970 A | 7/1990 | Stenger et al. |
| 4,998,764 A | 3/1991 | Nishio et al. |
| 5,021,510 A | 6/1991 | Vroomans |
| 5,221,712 A | 6/1993 | Ohmae et al. |
| 5,302,454 A | 4/1994 | Cecchin et al. |
| 5,506,299 A | 4/1996 | Gelles et al. |
| 5,665,821 A | 9/1997 | Lim et al. |
| 6,225,426 B1 | 5/2001 | Gillis et al. |
| 6,306,951 B1 | 10/2001 | Montag et al. |

FOREIGN PATENT DOCUMENTS

| DE | 2850181 C2 | 5/1980 |
|---|---|---|
| DE | 2850182 C2 | 6/1980 |
| DE | 2850182 | 6/1980 |
| EP | 0286734 | 10/1988 |
| EP | 0325151 | 7/1989 |
| GB | 2035198 | 6/1980 |
| WO | WO-93/00404 | 1/1993 |

*Primary Examiner*—Ana L. Woodward
(74) *Attorney, Agent, or Firm*—Connolly Bove Lodge & Hutz LLP

(57) ABSTRACT

A polymer blend disclosed has a coherent phase made from an aliphatic and/or semiaromatic (co)polyamide and, dispersed therein, a phase made from an olefin block copolymer grafted with intramolecular carboxylic anhydrides. The olefin block copolymer preferably comprises PP blocks and EPM blocks, and, where appropriate, also EBM blocks. A flat or tubular film is also disclosed wherein at least one layer thereof comprises the polymer blend. The film has preferably been mono- or biaxially oriented, and, where appropriate, also heat-set. A tubular film of the present invention is particularly suitable as a synthetic casing for sausages.

16 Claims, No Drawings

POLYAMIDE-CONTAINING POLYMER COMPOSITIONS AND FILMS PRODUCED THEREWITH

This application is a division of U.S. Ser. No. 09/963,512 filed Sep. 27, 2001 now U.S. Pat. No. 6,610,783.

BACKGROUND OF THE INVENTION

1. Field of the Invention

The invention relates to a polymer blend comprising a coherent phase made from an aliphatic and/or semiaromatic (co)polyamide and, dispersed therein, a phase made from an olefinic polymer. The present invention also relates to stretched flat or tubular films produced therefrom. The films are particularly suitable for packaging of food or drink materials, specifically as a synthetic casing for sausages.

2. Description of Related Art

Films based on polyamide are used widely as packaging materials for foods or consumable liquids. Such films generally have high mechanical strength (tensile strength and puncture resistance), as well as good dimensional stability when hot, thereby enabling heat-treatment of the food or drink materials while they are in a packaged condition (for example cooking or heat-sterilization). Once such films have absorbed sufficient moisture they generally have high mechanical flexibility and are therefore suitable for processing operations employed in automatic filling and packaging plants. They conform (or adhere) closely to the surface of the contents, and also provide a good barrier to oxygen and to flavors. In addition, such materials typically do not require use of plasticizers or other additives, thus dispensing with the inclusions constituents which are volatile or can migrate. Exemplary films can be produced by various methods, for example by film casting or film blowing, and each of these films may then also be mono- or biaxially oriented.

Nowadays, large quantities of polyamide (PA) are being processed using orientation processes, so to produce biaxially oriented tubular films. The orientation raises the strength of the film and improves its recovery performance. In addition, oriented films tend to shrink on exposure to heat as long as they have not been filly heat-set. Examples of such processes can be found, for example, in DE-C-28 50 182 and 28 50 181, and also in EP-A 325 151, each of which is incorporated herein by reference. In each case, biaxially oriented sausage casings based on aliphatic polyamides are described.

DE 28 50 181 and EP-A 325 151 describe casings made from a polyamide and from at least one other polymer. The other polymers disclosed in these two documents are an ionomer and/or a modified ethylene-vinyl acetate copolymer, (preferably a quaternary copolymer having units of ethylene, isobutylene, an aliphatically unsaturated carboxylic acid, and of an ester thereof as described in DE-A 28 50 181, or a combination of a polyalkylene terephthalate with a semiaromatic polyamide as described in EP-A 325 151).

The combination of aliphatic polyamide with one or more of such polymers can have an effect on the properties of the films produced therefrom. These properties include tear propagation resistance (which also affects the roll-back capabilities of sausage casings), elastic recovery performance, and the permeability of the films to oxygen and/or water vapor.

In the industrial processing of plastics, it is generally known that these types of polymers are generally added in relatively small proportions (up to about 20% by weight), since steady-state, (i.e. continuous, film-orientation) processes often place high requirements on the homogeneity of the material. Since the foreign polymers are incompatible with the polyamide at a molecular level, and therefore as the proportion of foreign polymer rises the content of disperse particles of foreign polymer in the polyamide phase become continues to increase as well. However, if the diameter of the disperse particles reaches an order of size comparable with the thickness of the film, the particles then penetrate the entire film and weaken its ability to tolerate mechanical stresses. Moreover, linking between the polyamide and the foreign polymer is restricted entirely to physical interactions. Thus the interfaces between these materials are areas of mechanical weakness. By their very nature, orientation processes induce high mechanical stress in the film and therefore require good mechanical coherence of the material. If this is not present, the film tears.

A characteristic property of all polyamides is (he marked dependence of their mechanical properties on moisture level. For example, anhydrous nylon-6 has a modulus of elasticity of about 3 GPa. The modulus of elasticity falls steeply under moist conditions and at 100% relative (ambient) humidity, reaches a value of only about 900 MPa. Other polyamides perform similarly. The "stiffness" or "flexibility" of polyamide is therefore highly dependent on ambient humidity.

WO 93/00404 (incorporated herein by reference) discloses a polyamide-based film whose properties are less markedly affected by moisture content. This result is achieved by blending the polyamide with a modified polyolefin. The modified polyolefin is prepared by reacting a crystalline or crystallizable homo- or copolymer made possessing and/or prepared using ±-olefin units having 2–6 carbon atoms, with unsaturated carboxylic acids or with anhydrides of the same. Examples of suitable polyolefins given are polyethylenes (specifically HDPE, LDPE, and LLDPE), polypropylene, and polybutylene. Examples of the unsaturated carboxylic acids or anhydrides disclosed are maleic acid, maleic anhydride, fumaric acid, crotonic acid, citraconic anhydride, or itaconic anhydride. The proportion of the modified polyolefin disclosed is from 5 to 50% by weight, based on the total weight of the polymer mixture. The modified polyolefin also may have been blended with an (unmodified) thermoplastic elastomer, as mentioned in Examples 2 and 3 of the above-mentioned WO specification. Examples of the thermoplastic elastomer given are an ethylene/propylene copolymer, an ethylene/1-butene copolymer, poly(1-butene), polybutadiene, a styrene/butadiene block copolymer, polyisoprene, and polyisobutylene. Films made from a mixture of polyamide with such a modified polyolefin are softer and more flexible than films made from pure polyamide. However, tubular films made from this material, are still not sufficiently elastic to be suitable as synthetic casings for sausages.

Flexibility is particularly important for packaging application involving moist food or consumable liquids and/or for packaging applications which may require heating of the packaging in water (vapor). The general desire is that at the moment of filling, the film should have high flexibility or low modulus of elasticity. In contrast, good dimensional stability of the film is desirable during any heating operation which follows. During the cooling process which then takes place, the contents shrink again, and as such, it is desirable that the film "responds", (i.e. as nearly as possible, has perfect elastic recovery).

Naturally, the recovery force is identical with the force with which the film opposes further extension. That being said, the recovery stresses produced in a dry, stiff film are higher than those produced by a moist, flexible film.

Consequently, polyamide films in a dry state fresh from production are not very suitable for the applications mentioned above. That is, polyamide films lack flexibility during filling/packing and are capable of little elastic extension. Once thoroughly moistened by the contents, polyamide films then become soft, but their recovery potential, which is in any case weak, becomes still further reduced. The end result is a "slack" or wrinkled package, and/or a packed product whose appearance is not very attractive to the consumer.

In order to make polyamide films more flexible in moist applications, they are almost always softened (conditioned) in water prior to processing. However, this operation has a number of disadvantages. First, softening always carries an inherent risk to hygiene, i.e. there is a danger of contamination or microbial infestation of the film surface. Second, before the softening process can be conducted, which in practice takes at least 30 min, the total amount of film needed must be determined in advance. Once films have been softened, they must be processed quickly since storage is likely to result in pronounced growth of microbes on the surface.

SUMMARY OF THE INVENTION

The present invention is directed to a polymer blend with a coherent phase made from an aliphatic and/or semiaromatic (co)polyamide and, dispersed therein, a phase made from an olefinic polymer, wherein the olefinic polymer is an olefin block copolymer grafted with intramolecular carboxylic anhydrides. The present invention is also directed to films produced from such polymer blends.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

DETAILED DESCRIPTION OF THE PREFERRED EMBODIMENT

Taking WO 93/00404 (which is incorporated herein by reference) as a basis, an object of the present invention was to improve upon polymeric materials described therein, so as to obtain suitable polymeric materials that could be used for producing films with ideal elasticity. Like conventional polyamide, the film material of the present invention is preferably capable of problem-free processing so as to produce biaxially stretched films or tubes, and preferably does not have any of the disadvantages described above. Even when dry, the film should have properties which are similar to or match those of premoistened (conditioned) polyamide, and should show no significant change, even after water ingress. Correspondingly, the flat or tubular films produced therefrom should be capable of use without prior application of water in moist applications (such as those typically found in sausage production). Even after heating and/or storage, the film, and specifically sausage casings made therefrom, should preferably still lie tightly against the contents and should not show any significant wrinkles.

These and other objects can be achieved, for example, by employing olefin block copolymers which have been grafted with intramolecular di- or polycarboxylic anhydrides and which, due to the resultant functionalization, can be dispersed in a (co)polyamide matrix. The properties of the matrix can be modified in the desired manner using a disperse phase.

The term (co)polyamide as used herein means polyamide and/or copolyamide, and the copolyamides may include two or more different monomer units. The semiaromatic copolyamides preferably contain units made from aromatic diamines or from aromatic dicarboxylic acids, but may also contain units made from aromatic aminocarboxylic acids or from lactams of these.

A coherent phase forms a matrix in which the disperse phase is distributed as isolated domains.

The proportion of the coherent polyamide phase is generally from 50 to 95% by weight, preferably from 60 to 90% by weight, particularly preferably from 65 to 80% by weight, based in each case on the total weight of the polymer blend.

The proportion of the grafted olefin block copolymer dispersed in the polyamide phase is generally from 5 to 50% by weight, preferably from 10 to 40% by weight, particularly preferably from 20 to 35% by weight, again based in each case on the total weight of the polymer blend.

The coherent polyamide phase may therefore comprise, for example, an aliphatic (co)polyamide, a mixture of two or more aliphatic (co)polyamides, or a mixture of at least one aliphatic (co)polyamide with at least one semiaromatic (co)polyamide.

Examples of suitable aliphatic (co)polyamides include nylon-6 (a polyamide made from ε-caprolactam), nylon-6/6,6 (a copolyamide made from ε-caprolactam, hexamethylenediamine and adipic acid), nylon-6/6,9 (a copolyamide made from ε-caprolactam, hexamethylenediamine and azelaic acid), or nylon-6/12 (a copolyamide made from ε-caprolactam and ω-laurolactam). Among these, particular preference is in turn given to nylon-6/6,6 in some embodiments.

Examples of suitable semiaromatic (co)polyamides include nylon-6,I (a copolyamide made from hexamethylenediamine and isophthalic acid), nylon-6,I/6,T (a copolyamide made from hexamethylenediamine, isophthalic acid and terephthalic acid), and nylon-6/6,I (a copolyamide made from e-caprolactam, hexamethylenediamine and isophthalic acid).

The molar mass (number average $M_n$) of the aliphatic or semiaromatic polyamide is preferably from about 20,000 to 40,000 g/mol.

The olefin block copolymer which is grafted with carboxylic anhydrides is generally derived from a "multimonomer multireactor process", in which at least two monomers are prepolymerized in different reaction systems. A typical monomer combination generally comprises propylene, ethylene, and 1-butene. The PP blocks polymerized in a first reaction system are reactor-blended with the EPM blocks built up in a second reactor. This PP/EPM reactor blend may then be in turn reactor-blended with EBM blocks prepolymerized in a third reactor (intragranular polymerization). The EBM may make up, for example, as much as 70% by volume of the final block copolymer. This polymerization technique was introduced to the market by Montell as "Catalloy Technology." The "Catalloy" process is described generally in U.S. Pat. No. 5,302,454. Olefin block copolymers of this type, which may also contain other α-olefins, as an option, in particular those having from 4 to 8 carbon atoms, may be represented, for example, by the structural formula (I)

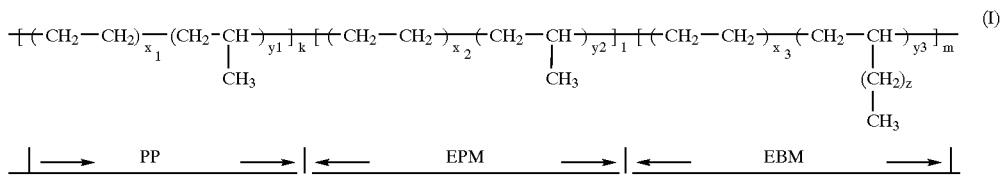

| | PP | | EPM | | EBM | |
|---|---|---|---|---|---|---| where k, l, and m are the degrees of polymerization of the individual blocks, and $x_1$, $x_2$, $x_3$, $y_1$, $y_2$, and $y_3$ give the monomer ratios within each block. z is the number of methylene groups in the α-olefin.

PP = polypropylene
EPM = ethylene/propylene copolymer block, and
EBM = ethylene/α-olefin copolymer block, such as ethylene/1-butene copolymer block.

The indices are within the following ranges:

| | | |
|---|---|---|
| k = 70 to 1 000 | $x_1$ = 0 to 0.3 | $y_1$ = 0.7 to 1.0 |
| l = 20 to 300 | $x_2$ = 0.3 to 0.9 | $y_2$ = 0.1 to 0.7 |
| m = 0 to 500 | $x_3$ = 0.2 to 0.9 | $y_3$ = 0.1 to 0.8 |
| | | z = 1 to 5 |

It may be advantageous in many instances for the degree of crystallinity of the grafted olefin block copolymer to be from 5 to 20%. It is preferably from 10 to 20%. Typical moduli of elasticity for this polymer are in the range from 30 to 300 MPa. The instant olefin block copolymer is therefore generally very soft and typically flexible and easy to shape.

The anhydride groups (not shown in formula 1) are the result of random lateral grafting on the base polymer. They are generally highly desirable constituents of the system, since polyamide and pure polyolefins (i.e. nonfunctionalized) have very little interaction and are therefore often considered completely incompatible at the molecular level due to their very different polarity. The compounds used for grafting generally include anhydrides of unsaturated aliphatic di- or polycarboxylic acids, for example maleic anhydride, citraconic anhydride, or itaconic anhydride (methylenesuccinic anhydride). Maleic anhydride is particularly preferred in some embodiments.

The proportion of grafting groups, based on the weight of the base polymer, is preferably from 0.3 to 0.8% by weight.

In addition, the polymer blend of the invention may also comprise any conventional additives, in conventional amounts. Examples of suitable additives include pigments, polyamide- or polyolefin-based color masterbatches, heat stabilizers and/or UTV stabilizers, mineral fillers, and native and/or destructured starch. The permeability of the instant polymer blend film to water vapor, oxygen, and other gases can be adjusted as desired, for example, by adding a material such as starch.

Grafting ratios from 0.3 to 0.8% by weight are generally difficult to achieve using processes known from the prior art. Thus another aspect of the present invention is directed to a process for preparing the grafted olefin block copolymer. The polyamides and the olefin base polymers are commercially available. To graft the olefin polymer, the base polymer is appropriately first activated using peroxide radicals.

It is known that when chain free radicals are generated, chain cleavage (β scission) can also take place as a side reaction—specifically at the polypropylene blocks. This is associated with impairment of the polyolefin property profile. The peroxide radicals needed are the result of thermally induced breakdown of organic peroxides, small amounts of which are preferably added, with the anhydride, to the olefin block copolymer. The amount of organic peroxides is typically in the range of from 0.01 to 0.5 percent by weight, relative to the weight of the olefin block copolymer.

Surprisingly, it has been found that a small amount of (monomeric) styrene is suitable for reducing the degradation of the polyolefin, and also for increasing the grafting ratio of the abovementioned activating and functionalizing molecules. The styrene increases the lifetime and selectivity of the free radicals, so that more anhydride can be grafted onto the base polymer and, at the same time, the number of chain breakages, and therefore the degradation of the chains, is reduced. The amount of the monomeric styrene is generally in the range of from 0.2 to 2.0 percent by weight, relative to the weight of the block copolymer.

Maleic anhydride is a powerful electron acceptor, capable of forming a charge-transfer complex with an appropriate electron donor. It is assumed that the free-radical activity of the maleic anhydride double bond is raised by an increased electron density in its environment, while the electron donor at the same time reduces polyolefin macroradical formation due to β scission. Monomeric styrene is a suitable electron donor of this type. Adding the styrene, therefore, markedly increases the grafting ratio while at the same time reducing chain degradation. Styrene raises the effectiveness of the initiator and at the same time promotes the grafting reaction of the anhydride.

A typical amount of carboxylic anhydride to added generally ranges from 0.1 to 3.0 phr (phr=parts per hundred of resin added), preferably from 0.2 to 2.0 phr, particularly preferably from 0.4 to 1.0 phr. Since less than the entire amount of carboxylic anhydride is grafted on, the resultant degree of grafting is preferably from 0.3 to 0.8% by weight of covalently bonded anhydride, based on the weight of the base polymer. When the process is carried out industrially, the unconverted anhydride and the styrene not incorporated can be removed through a melt-degassing step if desired.

The organic peroxides added for activation decompose thermally in a degradation reaction involving a number of stages, to give peroxide radicals, which in turn bring about the formation of chain free radicals. Particularly suitable peroxides include dicumyl peroxide (DCUP) and 2,5-dimethyl-2,5-bis(tert-butylperoxy)hexane (DHBP). These have different decomposition kinetics and different active oxygen (AO) content (DCUP: AO=5.6%; DHBP: AO=9.8%). The ratio by weight of maleic anhydride to peroxide is preferably from 5 to 20 (in the case of DCUP) and, respectively, from 10 to 30 (in the case of DHBP). The differences result from the higher AO content of DHBP. The amount of styrene to be added should generally be balanced with the amount of anhydride. Preferred molar ratios of styrene to maleic anhydride are from 0.4 to 1.4. A ratio of about 1 is particularly preferred in many instances.

The anhydride groups grafted onto the olefin block copolymer may react with the amino end groups of the polyamide in the context of "reactive blending" during further processing. The compatibilizing action of the anhydride, and also the covalent bonds produced between the olefin block copolymer and the polyamide, generally increase the level of interaction between the blend partners so markedly that a morphologically stable two-phase material is produced. This is what is described herein as a "coherent phase". In blends of this type, the morphology during the blending process is decisive in determining the property profile. The morphology desired in the present case is one in which there is a continuous phase made from polyamide and a discontinuous, microdisperse phase made from the olefin block copolymer. The diameters $d_p$ of the polyolefin particles in the blend should preferably range from 0.2 to 5.0 μm in order that they can survive the subsequent process of film extrusion and orientation and achieve the desired levels of strength for packaging applications.

In polymer blends of the invention, there are generally well-developed relationships between the structure of the polymer blend and its properties. The nature of the morphology formed during the course of the reactive blending process is therefore exceptionally important in many instances. The morphology produced can be described using the following dimensionless parameters, which include mixing specification parameters, material parameters and process parameters:

Capillary coefficient Ca:

$$Ca = \frac{\eta_{PA}(\dot{\gamma}) \cdot \dot{\gamma} \cdot R}{\sigma_{12}} \tag{1}$$

where $\eta_{PA}(\dot{\gamma})$ is the viscosity function of the copolyamide, $\dot{\gamma}$ is the shear rate, $\sigma_{12}$ is the interfacial surface tension, and $R$ is the particle radius.

Viscosity ratio $\lambda_1$ $$\lambda_1 = \frac{\eta_{PO}(\dot{\gamma})}{\eta_{PO}(\dot{\gamma})} \tag{2}$$

where $\eta_{PO}(\dot{\gamma})$ is the viscosity function of the polyolefin block copolymer.

Volume concentration ratio $\lambda_3$:

$$\lambda_3 = \frac{\phi_{PO}}{\phi_{PA}} \tag{3}$$

where $\phi_{PO}$ is the concentration by volume of the polyolefin block copolymer, and $\phi_{PE}$ is the concentration by volume of the copolymide.

The capillary coefficient Ca correlates the shear stresses acting on the polyolefin particles with the interfacial surface tension $\sigma_{12}$ and with the particle radius R.

Equations (1) and (2) show that the capillary coefficient Ca and the viscosity ratio $\lambda_1$ are locus functions within any given velocity field or shear rate field.

The break-up of a blend component, in this case the polyolefin block copolymer, into very small discrete particles occurs in the course of flow processes whenever the capillary coefficient Ca exceeds a critical value $Ca_{crit}$.

$$Ca > Ca_{crit} \tag{4a}$$

where $Ca_{crit}$ is a function of $\lambda_1$ and of the type of flow:

$$Ca_{crit} = f(\lambda_1, \text{type of flow}) \tag{4b}$$

For biaxial stretching flow the entire viscosity relationship range results in markedly smaller $Ca_{crit}$ values than for simple shear flow, for which it is only within the range $$0.1 \leq \lambda_1 \leq 3.5 \tag{5}$$

that sufficient dispersion of the polyolefin block copolymer phase occurs.

A consequence of these circumstances is that efficient particle formation is brought about in particular by the type of stretching which occurs in the open-sided wedge-shaped gaps of wide kneading blocks.

If approximately constant interfacial surface tension $\sigma_{12}$ is assumed and the criterion $$\frac{\lambda_3}{\lambda_1} = \frac{\Phi_{PO} \cdot \eta_{PA}(\dot{\gamma})}{\Phi_{PA} \cdot \eta_{PO}(\dot{\gamma})} < 1 \tag{6}$$

is fulfilled, a two-phase material is produced comprising the polyolefin block copolymer as microdisperse phase embedded into the continuous copolymer matrix.

Cocontinuous phase structures form when the criterion $$\frac{\eta_{PO}(\dot{\gamma})}{\eta_{PA}(\dot{\gamma})} = \frac{\Phi_{PO}}{\Phi_{PA}}$$

is fulfilled. Cocontinuous phase structures of this type are generally undesirable for the polymer blend of the invention and are typically not intended to arise.

As the ratio $\lambda_3/\lambda_1$ approaches the value 1, the average polyolefin particle diameters $d_p$ produced become larger and the blend structure becomes coarser. The coarser structure is attended by a reduction, i.e. a downgrading, of mechanical property values. Knowledge of these circumstances is one criterion that enables those skilled in the art to set suitable mixing ratios and particle ranges.

One way of preparing the polymer blends of the invention is in a reactive blending process, using an extruder with closely intermeshing corotating twin screws. In compounding extruders of this type, both the barrel and the screw elements are generally of modular design, and specifically tailored barrel arrangements and screw designs can therefore be implemented.

Recommended equipment for preparing the polymer blends of the invention included twin-screw extruders with high processing length, i.e. with a high ratio of length to diameter. Preferred L/D ratios are in the range from 40 to 56. The modular-structure barrel can be subdivided into heating/cooling zones each 4D in length, for example.

An example of a particularly suitable device is a twin-screw extruder with a screw diameter of 40 mm, an L/D ratio of 56, a screw rotation rate of 250 rpm, and 14 heating/cooling zones. The temperature setting within the interior of the extruder here rises from 180° C. in the 1st zone in 10° C. steps from one zone to the next to 270° C. in the 10th zone. It then reduces again down to about 250° C. in the 14th barrel zone. It is appropriate for the pretreated olefin block copolymer to be fed in the 1st zone of the twin-screw extruder, preferably with the aid of a gravimetric metering system. The polyamide pellets (mixture) is/are fed at about the 8th zone, for example with the aid of a twin-shaft ancillary-flow feeder. Volatile components are removed from the polymer melt by applying suction to a nonpressurized feed zone in which there is only partial filling of the screw channel. Volatile components can derive from unbonded styrene, from the breakdown of the organic peroxide, from unconverted carboxylic anhydride (which is separated out from the degassing stream by way of cold traps), or from the (co)polyamide (if this had not been sufficiently predried and still comprises residues of water).

Once all of the chemical reactions have been fully concluded, the polymer blend treated in this way can be introduced into an extrusion die. The extrudate passes through a cooling bath and is then comminuted to give pellets. The pellets form the starting product for a subsequent process of film extrusion and biaxial orientation.

There can be an upstream mixing step in which a liquid mixture of the specified composition is produced from carboxylic anhydride, organic peroxide, and styrene. The mixture is added to a defined weight of olefin block copolymer, in the vessel of a gyro mixer. The vessel is then closed and the mixing procedure commenced. Due to the low degree of crystallinity of the polyolefin, the liquid mixture is absorbed spontaneously by the pellets. This technique gives excellent preliminary distribution of the reaction mixture at a quasi-molecular level. The polyolefin pellets treated in this way are introduced to the twin-screw extruder by way of a gravimetric metering system. Integration of a first kneading block, combined with a distributive mixing section, ensures that plastification of these pellets is promoted. In the downstream zones, the peroxide decomposes thermally and the hydrogen abstraction described and the grafting-on of anhydride at the free-radical positions in the chain begin. Combinations of kneading blocks and mixing sections ensure quick completion of the grafting reaction and total degradation of the peroxide present. Once the grafting reaction has been completed, the polyamide pellets (mixture) is/are fed to the compounding extruder by way of an ancillary-flow feeder. Raising the barrel temperatures to up to 270° C. melts the polyamide and initiates the coupling reaction between the amino end groups and the anhydride groups. Once the entire system has been homogeneously mixed, the melt is degassed. The final screw section of the twin-screw extruder builds up the pressure needed to overcome the flow resistance created by the extrusion head.

It has proven advantageous in some embodiments to install in-line or on-line sensors just upstream of the extrusion head to establish whether the chemical reactions are proceeding as expected. Sensor systems which have proven successful include on-line rheometers (using dynamic or stationary measuring methods) and on-line FTIR spectrometers.

The present application also provides a flat or tubular film which comprises the polymer blend of the invention. In some embodiments, the flat or tubular film encompasses at least one layer comprising a polymer blend ad described herein and/or comprises at least one layer that has been produced from such a polymer blend. The film preferably has mono- or biaxial orientation.

Suitable processes for producing biaxially oriented flat or tubular films include extrusion processes in which films are first produced thermoplastically and then post-oriented in their thermoelastic range. Such processes are known per se to one skilled in the art.

To produce flat films, the polymer blend described above is melted again in an extruder, preferably a single-screw extruder. The temperatures in the extruder are determined based on the melting point of the polyamide component(s), and the transition zone and metering zone are generally heated to temperatures which are above the melting point of the highest-melting component by from about 30 to 50° C. The extruder conveys the melt through a slot die. The melt film discharged is solidified on a chill roll. Rapid cooling is desirable here in order to prevent premature crystallization of the polymers. The resultant primary film is drawn off and then again heated to a temperature above the glass transition point of the polyamide—typically in the range from 70 to 95° C., for example by hot air or with the aid of IR radiation.

It is then particularly appropriate for the film to be oriented longitudinally and transversely in a continuously operating stretching frame arranged directly downstream. Appropriate stretching frames are known and available commercially from a number of manufacturers. Depending on their mode of construction, they give quasi-simultaneous stretching (with the longitudinal stretching to some extent preceding the transverse stretching) or fully simultaneous stretching. The geometric stretching factors can generally be in the range from 2 to 4.5 (longitudinal and transverse). Preference is given to values of from 2.5 to 3.5 longitudinally and from 3.2 to 4 transversely.

After leaving the stretching zone, the film may optionally be subjected to another heat treatment (heat-setting). This reduces or completely eliminates the tendency of the film to shrink on heating (heat-shrinkage). The film is usually heated to temperatures of from 100 to 180° C. during this process. Suitable heat sources include the abovementioned media and/or heated rollers.

Finally, the film is run through an arrangement of cooling and polishing rollers, and may then be wound up and further processed.

The production of oriented tubular films is based on the same fundamental principle. However, the melt is extruded through an annular die and then cooled, forming a uniform primary tube. Examples of efforts for shaping the primary tube include the introduction of air or of a suitable liquid into the interior of the tube, or alternatively a calibrator through which the tube has been passed can be employed. Calibrators are often the preferred industrial method.

The cooled primary tube runs through a pair of pinch rollers, then the heating zone, and another pair of pinch rollers. The volume of air enclosed between the rollers forces simultaneous longitudinal and transverse orientation. The longitudinal stretching is additionally controlled via the extent to which the speed of the second pair of rollers is increased. The stretching factors generally approximate the abovementioned values for flat films.

The tubular film also may be subsequently heat-set. By this, the tube is caused to traverse another heating zone, where it may be heated either in a collapsed state or else after re-expansion. Heating sources which may be used are again hot air and IR radiation, or—in the case of the collapsed tube—heated rollers. Depending on the desired residual heat shrinkage, the temperature of the tube may be, for example, from 100 to 170° C.

The resultant collapsed tube is cooled, wound up and then stored before further processing.

The process described for a tube production is also known to the skilled worker as a "double-bubble" process.

For specific applications, e.g. if a film with an increased water-vapor barrier is desired, structures of two or more layers are advantageous, at least one layer comprising a polymer blend according to the invention. Additional layers may comprise, for example, polyolefins (e.g. PE or PP), of (co)polyamides, of (co)polymers with ethylenically unsaturated monomers (e.g. vinyl acetate, vinyl alcohol, or (meth) acrylic acid), of vinylidene chloride copolymers, of acrylic acid copolymers, of ionomer resins, or of mixtures of the (co)polymers mentioned. Layers made from PE or from copolyamides are preferred in some embodiments.

In a two-layer structure, the additional layer (layer other than the instant polymer blend) is preferably on the side that will in the end, be facing toward the packaged product or contents (in the case of tubes, the inner side). When there are more than two layers, there may be various arrangements, and any arrangement of layers can be employed as desired or as useful for a particular application.

To achieve adhesion between the layers, additional adhesion-promoting materials may need to be introduced into the structure. Suitable materials include any known adhesion-promoting polymers which can be used in coextrusion as known to those of skill in the art. Among these, preference is given to anhydride-grafted polyolefins. The adhesion promoter may either be a material admixed with one or more of the additional layers, or be in the form of one or more discrete layers.

The films of the invention having two or more layers usually encompass no more than 5 layers, but more layers could be used if needed for any reason.

The films having two or more layers are generally produced with the aid of coextrusion dies. Dies of this type may have the shape of slot dies or of annular groove dies. The die is fed with the polymer blend of the invention via one or more extruders, and with the other polymer(s) by other extruders. The melt film discharged is then composed of mutually superposed layers. Solidification, orientation, and, where appropriate, heat-setting then take place as described above.

The examples below serve to illustrate the invention. The term "phr" here means parts per hundred of resin (percent by weight based on the amount of polymer(s) initially charged). Unless otherwise stated, percentages are by weight. (C) means comparison or comparative experiment.

The following compounds are used in the examples:
1. A block copolymer based on PP blocks and EPM blocks and having a density of from 0.88 to 0.90 g/cm$^3$, a melting point (determined by differential scanning calorimetry, DSC) of 144° C., a melt flow index (MFI) of 0.6 g/10 min at 230° C. with a load of 2.16 kg, and a modulus of elasticity of 121 MPa, obtainable as ®Hifax CA 10A from Montell Polyolefins (also abbreviated to PP below),
2. a nylon-6/6,6 copolyalmide with a melting point $T_m$ of 196° C. (determined by DSC) and relative viscosity of 3.2 dl/g (determined in 96% strength sulfuric acid), obtainable as ®Ultramid C 35 from BASF Aktiengesellschaft (also abbreviated to PA below),
3. maleic anhydride (MAH),
4. dicumyl peroxide (DCUP),
2,5-dimethyl-2,5-bis(tert-butylperoxy)hexane (DHBP), and
6. styrene (St).

The products were characterized by the following properties:
1. Mechanical properties
  a) tear strength $\sigma_B$ [N/MM$^2$]
  b) elongation at break $\epsilon_B$ [%]
  c) stress at 5% strain $\sigma_5$ [N/mm$^2$]
  d) stress at 15% strain $\sigma_{15}$ [N/mm$^2$]
The appropriate test data were determined using a tensile testing machine to DIN 53455 (advance rate: 50 mm/min).
  e) Strain test on blow-expanded tubular film:
For this test, a section of tube about 1 m in length is tightly sealed at one end, and pressed air is introduced from the other end until a defined final pressure is reached. The circumference of the pressurized tube is then determined. The strain value $\mu_p$ is given by the equation $$\varepsilon_P = \frac{U_P - U_O}{U_O} \cdot 100[\%]$$

where
  $U_p$ is the circumference of the tube under blow-expression pressure p and
  $U_O$ is the initial circumference (twice the film width).
The strain under blow-expansion gives an indication of the behavior of the film when used as a sausage casing. The internal pressures usually reached during stuffing with sausage emulsion are usually from 20 to 25 kPa.
2. Other properties
  f) Water-vapor permeability (water-vapor transmission rate, WTR) This is determined to DIN 53 122.
  g) Heat shrinkage
This test determines the extent of reduction in the length or width of a specimen of the film after it has aged for 15 min in water at 80° C.

PREPARATION EXAMPLE 1

100 phr of ®Hifax CA 10A PP pellets were placed in a gyro mixer. The following were then added:
  0.5 phr of maleic anhydride,
  0.033 phr of dicumyl peroxide (–MAH/DCUP=15), and
  0.48 phr of styrene (St),
in each case based on the PP component. The components were then mixed for 30 min in the tightly sealed mixer. A gravimetric metering system was then used to feed the resultant loaded pellets into the feed aperture of the ZSK 40 twin-screw extruder described above with an LID ratio of 56 and 14 heating/cooling zones. The screw rotation rate was 250 rpm. The melt flow rate was fixed at a prescribed value $\dot{m}_1$ of 10.5 kg/h. In the first 8 zones the PP was melted, the peroxide was decomposed, the PP chains were activated by the peroxide radicals, and the maleic anhydride was grafted onto the macroradicals. At the 8th zone, the C35 copolyamide was introduced (melt flow rate $\dot{m}_2$) with the aid of a twin-shaft ancillary-flow feeder to which material was likewise supplied under gravimetric control. Downstream there were kneading blocks and distributive mixing sections installed, which brought about formation of a two-phase system in which the PP and the nylon-6/6,6 copolyamide have covalent linking via the grafted-on maleic anhydride molecules. Volatile products produced in particular by thermal degradation of the peroxide were drawn off—as described—and collected in a liquid-nitrogen-cooled cold trap. At a polyamide melt flow rate $\dot{m}_2$ of 19.5 kg/h the total throughput $\dot{m}_G$ (=$\dot{m}_1$+$\dot{m}_2$) was 30 kg/h. The homogenized polymer melt was finally extruded in the form of rounded extrudates, which were cooled in a cooling bath and then comminuted to give pellets. The PA:PP weight ratio in the product was therefore 65:35. The polymer blend had a continuous polyamide phase with microdisperse PP domains embedded therein.

PREPARATION EXAMPLE 2

Example 1 was repeated except that the free-radical initiator used was 2,5-dimethyl-2,5-bis(tert-butylperoxy) hexane rather than dicumyl peroxide.

Since the active oxygen content was higher, the ratio selected for maleic anhydride: 2,5-dimethyl-2,5-bis(tert-butylperoxy)hexane was 20, corresponding to 0.025 phr of peroxide. In addition, the melt flow rates $\dot{m}_1$ and $\dot{m}_2$ were varied ($\dot{m}_1$ reduced to 9.0 kg/h and $\dot{m}_2$ increased to 21.0 kg/h, the total throughput being unchanged). The PA:PP ratio was therefore 70:30.

PREPARATION EXAMPLE 3

Example 2 was repeated with the single exception that $\dot{m}_1$ was increased to 12.0 kg/h and $\dot{m}_2$ was reduced to 18.0 kg/h. The PA:PP ratio was therefore 60:40.

PREPARATION EXAMPLES 4 to 6

Example 1 was repeated, except that the proportions of the compounds used for grafting were changed. However, the polymers and their ratio by weight (PA:PP=65:35) were as in Example 1.

TABLE 1

| Example | Proportions in phr | | | |
|---|---|---|---|---|
| No. | Hifax CA 10 | MAH | DCUP | Styrene |
| 4 | 100 | 0.25 | 0.0166 | 0.24 |
| 5 | 100 | 0.50 | 0.033 | 0.48 |
| 6 | 100 | 1.50 | 0.100 | 1.44 |

PREPARATION EXAMPLE 7 (comparison)

As in Example 1, a blend was prepared from PP and PA, but maleic anhydride, dicumyl peroxide and styrene were not included.

PROCESSING EXAMPLES

The blends prepared as in Examples 1 to 7 were processed to give blown films. This was done using a Collin laboratory blown-film plant. The blow-up ratio $D_F/D_o$ was 3.0 and the longitudinal extension $E_F/E_o$ was about 6. The tensile strength and elongation at break of the resultant films were measured perpendicular to the take-off direction (in machine direction), the values determined being as follows:

TABLE 2

| Example No. | 1 | 2 | 3 | 4 | 5 | 6 | 7 |
|---|---|---|---|---|---|---|---|
| $\sigma_B$ [N/mm²] | 72 | 79 | 69 | 48 | 72 | 53 | 25 |
| $\epsilon_B$ [%] | 553 | 562 | 535 | 462 | 553 | 457 | 320 |

The values in the table show that the blown films produced from the polymer blend of the invention resist breaking to a markedly higher stress level. The elongation at break is also improved over the comparative example.

EXAMPLE 8

The pellets described in Example 1 were again melted in a single-screw extruder whose temperature profile ranged from 160° C. in the feed zone to 240° C. at the die head, and extruded through an annular die. A calibrator was used to solidify the polymer melt to give a primary tube of 21 mm diameter. The primary tube then proceeded through two pairs of pinch rollers with a ratio of 1:2.2 between their circumferential speeds, exerting longitudinal tension. Between the pinchings, the tube was heated to about 75° C. by IR radiation. A volume of air was introduced into the interior of the tube, so that the heated tubular film was then also oriented transversely. The diameter of the tube after transverse orientation was 70 mm.

The tube was then again filled with air and heat-set at about 130° C., whereupon the diameter of the tubular film reduced by about 6%. The tubular film then proceeded through another pair of pinch rollers, both pairs of rollers having the same circumferential speed. Finally, the tube was cooled and rolled up. The final diameter of the tubular film was 66 mm, with an overall transverse orientation ratio of 1:3.14, an overall longitudinal orientation ratio of 1:2.2 and an overall two-dimensional orientation ratio of 1:6.91.

PROCESSING EXAMPLE 9

The polymer blend prepared as in Example 2 was processed as in Example 8 to give an oriented and heat-set tubular film with a final diameter of 66 mm.

PROCESSING EXAMPLE 10

The polymer blend described in Example 3 was processed as in Example 8 to give an oriented and heat-set tubular film. However, the ratio of circumferential speeds of the two pairs of rollers was 1:2.0.

PROCESSING EXAMPLE 11 (comparison)

Pure nylon-6/6,6 (®Ultramid C35) was processed as in Example 8 to give a tubular film with a diameter of 66 mm.

PROCESSING EXAMPLE 12 (comparison)

A single-layer sausage casing as in DE-C 28 50 181 including a quaternary copolymer having units of ethylene, isobutylene, an aliphatically unsaturated carboxylic acid, and of an ester thereof, with a diameter of 60 mm (®Betan from Naturin GmbH) was studied for comparative purposes.

Table 3 shows the mechanical properties of the biaxially oriented films. All of the films were conditioned at 20° C. and 60% r.h. and then tested without further moistening.

TABLE 3

| | Film | | | Strain in blown-expansion test | | Heat- | Water-vapor |
|---|---|---|---|---|---|---|---|
| Ex. No. | thickness μm | $\sigma_{15}$ transverse N/mm² | $\sigma_{15}$ longitudinal N/mm² | at 25 kPa % | at 50 kPa % | shrinkage transverse % | permeability % |
| 8 | 42 | 20.2 | 46.1 | 7.2 | 13.9 | 6 | 7.6 |
| 9 | 41 | 22.2 | 49.6 | 6.3 | 12.3 | 6 | 7.0 |
| 10 | 43 | 17.5 | 41.0 | 8.8 | 16.1 | 5 | 6.6 |
| 11(C) | 41 | 36.0 | 62.0 | 2.2 | 4.1 | 8 | 27.0 |
| 12(C) | 39 | 55.0 | 82.0 | 2.6 | 5.3 | 10 | 13.0 |

Sections of dry tube were manually filled with, in each case, 400 g of fine-grain scalded-emulsion sausage composition, and their ends were sealed with metal clips. The sausages were then cooked in a scalding chamber for 60 min at 78° C. and 100% relative humidity. Appearance and consistency (see Table 4) were assessed after the sausages had cooled to 7° C.

TABLE 4

| Ex. No. | Transverse strain on filling % | Final assessment | |
|---|---|---|---|
| | | Fit | Special features |
| 8 | 6.3 | no wrinkles, firm | |
| 9 | 5.9 | no wrinkles, firm | |
| 10 | 6.8 | no wrinkles, very firm | |
| 11(C) | 2.0 | long wrinkles in clip region, film has loose fit | juices escape (jelly deposits) |
| 12(C) | 1.8 | wrinkles over entire sausage, film has loose fit | marked escape of juices (jelly deposits) |

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined bye the appended claims and their equivalents.

The priority document, German Patent Application No. 100 47 772.0, filed Sep. 27, 2000 is incorporated herein by reference in its entirety including the title, specification, claims, figures (if any), tables, and abstract.

As used herein and in the following claims, articles such as "the", "a" and "an" can connote the singular or plural of the object that follows.

All documents referred to herein are specifically incorporated herein by reference in their entireties to the extent referred to.

What is claimed is:

1. A film having at least one layer comprising a polymer blend where the polymer blend consists essentially of:
   a coherent phase made from an aliphatic and/or semiaromatic (co)polyamide and, dispersed therein,
   a phase made from an olefin block copolymer consisting essentially of units of ethylene or propylene, and optionally, of linear (C4–C8) α-olefins, and said block copolymer being grafted with intramolecular carboxylic anhydrides.

2. A film as claimed in claim 1, wherein said coherent phase is present in an amount from 50 to 95% by weight, based in each case on the total weight of the polymer blend.

3. A film as claimed in claim 1, wherein the coherent phase comprises an aliphatic (co)polyamide, a mixture of two or more aliphatic (co)polyamides, or a mixture of at least one aliphatic (co)polyamide with at least one semiaromatic (co)polyamide.

4. A film as claimed in claim 1, wherein the molar mass $M_n$ of the (co)polyamide is from about 20,000 to 40,000 g/mol.

5. A film as claimed in claim 1, wherein the olefin block copolymer comprises polypropylene (PP) blocks and/or ethylene/propylene copolymer (EPM) blocks.

6. A film as claimed in claim 1, wherein the olefin block copolymer includes at least one selected from the group consisting of polypropylene (PP) blocks, ethylene/propylene copolymer (EPM) blocks, and ethylene/linear (C4–C8) α-olefin copolymer (EBM) blocks.

7. A film as claimed in claim 1, wherein the proportion of graft groups is from 0.3 to 0.8% by weight, based on the weight of the olefin block copolymer.

8. A film as claimed in claim 7, wherein the olefin block copolymer has been grafted with an anhydride of an unsaturated, aliphatic polycarboxylic acid.

9. A film as claimed in claim 8, wherein the unsaturated aliphatic polycarboxylic anhydride comprises maleic anhydride, citraconic anhydride, or itaconic anhydride.

10. A film as claimed in claim 9, wherein the olefin block copolymer has been grafted with maleic anhydride in the presence of monomeric styrene and an organic peroxide.

11. A film as claimed in claim 10, wherein the molar ratio of monomeric styrene to maleic anhydride is in the range from 0.4 to 1.4.

12. A film as claimed in claim 1, wherein the aliphatic and/or semiaromatic (co)polyamide and the olefin block copolymer grafted with intramolecular carboxylic anhydrides have been reacted with one another, thereby forming covalent bonds.

13. A film as claimed in claim 1, wherein said phase made from an olefin block copolymer comprises particles with a diameter $d_p$ of from 0.2 to 5.0 μm.

14. A film as claimed in claim 1, which has been mono- or biaxially oriented.

15. A film as claimed in claim 1, which has been heat-set.

16. A sausage casing comprising a film as claimed in claim 1.

* * * * *

UNITED STATES PATENT AND TRADEMARK OFFICE
CERTIFICATE OF CORRECTION

PATENT NO. : 6,749,912 B2
DATED : June 15, 2004
INVENTOR(S) : Ulrich Delius et al.

It is certified that error appears in the above-identified patent and that said Letters Patent is hereby corrected as shown below:

Title page,
Item [73], Assignee, please delete "Wiesdbaden" and insert -- Weisbaden --.

Signed and Sealed this

Eighth Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,749,912 B2
APPLICATION NO. : 10/602676
DATED : June 15, 2004
INVENTOR(S) : Ulrich Delius et al.

It is certified that error appears in the above-identified patent and that said Letters Patent is hereby corrected as shown below:

In the Claims:

In claim 1, line 5 (col. 15, line 45) it should read:

--A phase from an olefin block copolymer comprising at least two different blocks said olefin block copolymer consisting...--

Signed and Sealed this

Second Day of October, 2007

JON W. DUDAS
*Director of the United States Patent and Trademark Office*